(12) United States Patent
Lor

(10) Patent No.: US 7,355,970 B2
(45) Date of Patent: Apr. 8, 2008

(54) METHOD AND APPARATUS FOR ENABLING ACCESS ON A NETWORK SWITCH

(75) Inventor: Kar-Wing Edward Lor, Castro Valley, CA (US)

(73) Assignee: Broadcom Corporation, Irvine, CA (US)

( * ) Notice: Subject to any disclaimer, the term of this patent is extended or adjusted under 35 U.S.C. 154(b) by 980 days.

(21) Appl. No.: 09/970,650

(22) Filed: Oct. 5, 2001

(65) Prior Publication Data

US 2003/0091042 A1    May 15, 2003

(51) Int. Cl.
*H04L 12/54* (2006.01)

(52) U.S. Cl. ............... 370/231; 370/401; 370/428; 709/225

(58) Field of Classification Search ......... 370/230, 370/230.1, 231–235, 400, 401, 428, 463; 709/223–228
See application file for complete search history.

(56) References Cited

U.S. PATENT DOCUMENTS

| | | | |
|---|---|---|---|
| 5,245,606 A | * | 9/1993 | DeSouza ............ 370/401 |
| 5,274,631 A | * | 12/1993 | Bhardwaj ........... 370/401 |
| 5,278,789 A | | 1/1994 | Inoue et al. |
| 5,390,173 A | | 2/1995 | Spinney et al. |
| 5,414,704 A | | 5/1995 | Spinney |
| 5,423,015 A | | 6/1995 | Chung |
| 5,459,717 A | | 10/1995 | Mullan et al. |
| 5,473,607 A | | 12/1995 | Hausman et al. |
| 5,490,252 A | * | 2/1996 | Macera et al. ........ 709/249 |
| 5,499,295 A | | 3/1996 | Cooper |
| 5,524,254 A | | 6/1996 | Morgan et al. |
| 5,555,398 A | | 9/1996 | Raman |
| 5,568,477 A | | 10/1996 | Galand et al. |

(Continued)

FOREIGN PATENT DOCUMENTS

EP       0312917 A2      4/1989

(Continued)

OTHER PUBLICATIONS

"A High-Speed CMOS Circuit for 1.2-Gb/s 16×16 ATM Switching," Alain Chemarin et al. 8107 IEEE Journal of Solid-State Circuits 27(1992) July, No. 7, New York, US, pp. 1116-1120.

(Continued)

*Primary Examiner*—Wing Chan
*Assistant Examiner*—Duc Duong
(74) *Attorney, Agent, or Firm*—Squire, Sanders & Dempsey, LLP

(57) ABSTRACT

A data switch for network communications includes a data port interface which supports at least one data port which transmits and receives data. The switch also includes a CPU interface, where the CPU interface is configured to communicate with a CPU, and a memory management unit, including a memory interface for communicating data from the data port interface to the switch memory. A communication channel is also provided, communicating data and messaging information between the data port interface, the CPU interface, the switch memory, and the memory management unit. The data port interface also includes an access control unit that filters the data coming into the data port interface and takes selective action on the data by applying a set of filter rules such that access to the switch is controlled by the set of filter rules.

21 Claims, 5 Drawing Sheets

U.S. PATENT DOCUMENTS

| | | | |
|---|---|---|---|
| 5,579,301 A | 11/1996 | Ganson et al. | |
| 5,644,784 A | 7/1997 | Peek | |
| 5,652,579 A | 7/1997 | Yamada et al. | |
| 5,696,899 A | 12/1997 | Kalwitz | |
| 5,742,613 A | 4/1998 | MacDonald | |
| 5,748,631 A | 5/1998 | Bergantino et al. | |
| 5,781,549 A | 7/1998 | Dai | |
| 5,787,084 A | 7/1998 | Hoang et al. | |
| 5,790,539 A | 8/1998 | Chao et al. | |
| 5,802,052 A | 9/1998 | Venkataraman | |
| 5,802,287 A | 9/1998 | Rostoker et al. | |
| 5,825,772 A | 10/1998 | Dobbins et al. | |
| 5,828,653 A | 10/1998 | Goss | |
| 5,831,980 A | 11/1998 | Varma et al. | |
| 5,835,726 A * | 11/1998 | Shwed et al. | 709/229 |
| 5,842,038 A | 11/1998 | Williams et al. | |
| 5,845,081 A | 12/1998 | Rangarajan et al. | |
| 5,852,607 A * | 12/1998 | Chin | 370/401 |
| 5,887,187 A | 3/1999 | Rostoker et al. | |
| 5,892,922 A | 4/1999 | Lorenz | |
| 5,898,687 A | 4/1999 | Harriman et al. | |
| 5,909,686 A | 6/1999 | Muller et al. | |
| 5,918,074 A | 6/1999 | Wright et al. | |
| 5,938,736 A * | 8/1999 | Muller et al. | 709/243 |
| 5,940,596 A | 8/1999 | Rajan et al. | |
| 5,983,270 A * | 11/1999 | Abraham et al. | 709/224 |
| 5,987,507 A | 11/1999 | Creedon et al. | |
| 6,011,795 A | 1/2000 | Varghese et al. | |
| 6,041,053 A | 3/2000 | Douceur et al. | |
| 6,061,351 A | 5/2000 | Erimli et al. | |
| 6,104,696 A | 8/2000 | Kadambi et al. | |
| 6,119,196 A | 9/2000 | Muller et al. | |
| 6,175,902 B1 | 1/2001 | Runaldue et al. | |
| 6,185,185 B1 | 2/2001 | Bass et al. | |
| 6,341,130 B1 * | 1/2002 | Lakshman et al. | 370/389 |
| 2001/0012294 A1 | 8/2001 | Kadambi et al. | |
| 2002/0023089 A1* | 2/2002 | Woo | 707/101 |
| 2002/0083331 A1* | 6/2002 | Krumel | 713/200 |

FOREIGN PATENT DOCUMENTS

| | | |
|---|---|---|
| EP | 0465090 A1 | 1/1992 |
| EP | 0752796 A2 | 1/1997 |
| EP | 0849917 A2 | 6/1998 |
| EP | 0853441 A2 | 7/1998 |
| EP | 0854606 A2 | 7/1998 |
| EP | 0859492 A2 | 8/1998 |
| EP | 0862349 A2 | 9/1998 |
| EP | 0907300 A2 | 4/1999 |
| FR | 2 725 573 A1 | 4/1996 |
| JP | 4-189023 | 7/1992 |
| WO | WO 98/09473 | 5/1998 |
| WO | WO 99/00938 | 1/1999 |
| WO | WO 99/00939 | 1/1999 |
| WO | WO 99/00944 | 1/1999 |
| WO | WO 99/00945 | 1/1999 |
| WO | WO 99/00948 | 1/1999 |
| WO | WO 99/00949 | 1/1999 |
| WO | WO 99/00950 | 1/1999 |
| WO | WO 01/19040 A1 | 3/2001 |
| WO | WO9900936 A1 | 6/2001 |

OTHER PUBLICATIONS

"Local Area Network Switch Frame Lookup Techniques for Increased Speed and Flexibility," 700 IBM Technical Disclosure Bulletin 38(1995) July, No. 7, Armonk, NY, US, pp. 221-222.

"Queue Management for Shared Buffer and Shared Multi-buffer ATM Switches," Yu-Sheng Lin et al., Department of Electronics Engineering & Institute of Electronics, National Chiao Tung University, Hsinchu, Taiwan, R.O.C., Mar. 24, 1996, pp. 688-695.

"A 622-Mb/s 8×8 ATM Switch Chip Set with Shared Multibuffer Architecture," Harufusa Kondoh et al., 8107 IEEE Journal of Solid-State Circuits 28(1993) July, No. 7, New York, US, pp. 808-814.

"Catalyst 8500 CSR Architecture," White Paper XP-002151999, Cisco Systems Inc. 1998, pp. 1-19.

"Computer Networks," A.S. Tanenbaum, Prentice-Hall Int., USA, XP-002147300(1998), Sec. 5.2-Sec. 5.3, pp. 309-320.

* cited by examiner

METHOD AND APPARATUS FOR ENABLING ACCESS ON A NETWORK SWITCH

BACKGROUND OF THE INVENTION

1. Field of the Invention

The invention relates to an apparatus for high performance switching in local area communications networks such as token ring, ATM, Ethernet, Fast Ethernet, 1 gigabit and 10,000 Mbits/s Ethernet environments, generally known as LANs. In particular, the invention relates to a method and apparatus for enabling and controlling access on a network switch.

2. Description of the Related Art

As computer performance has increased in recent years, the demands on computer networks has significantly increased; faster computer processors and higher memory capabilities need networks with high bandwidth capabilities to enable high speed transfer of significant amounts of data. The well-known Ethernet technology, which is based upon numerous IEEE Ethernet standards, is one example of computer networking technology which has been able to be modified and improved to remain a viable computing technology. A more complete discussion of prior art networking systems can be found, for example, in SWITCHED AND FAST ETHERNET, by Breyer and Riley (Ziff-Davis, 1996), and numerous IEEE publications relating to IEEE 802 standards.

Based upon the Open Systems Interconnect (OSI) 7-layer reference model, network capabilities have grown through the development of repeaters, bridges, routers, and, more recently, "switches", which operate with various types of communication media. Thickwire, thinwire, twisted pair, and optical fiber are examples of media which has been used for computer networks. Switches, as they relate to computer networking and to Ethernet, are hardware-based devices which control the flow of data packets or cells based upon destination address information which is available in each packet. A properly designed and implemented switch should be capable of receiving a packet and switching the packet to an appropriate output port at what is referred to wirespeed or linespeed, which is the maximum speed capability of the particular network.

Basic Ethernet wirespeed is up to 10 megabits per second, and Fast Ethernet is up to 100 megabits per second. The newest Ethernet is referred to as 10,000 Mbits/s Ethernet, and is capable of transmitting data over a network at a rate of up to 10,000 megabits per second. As speed has increased, design constraints and design requirements have become more and more complex with respect to following appropriate design and protocol rules and providing a low cost, commercially viable solution. For example, when filtering packets in a switch based on assigned criteria, if the filtering process delays the processing of a packet by the switch, then it becomes almost impossible to operate the switch or the network at linespeed.

One system of filtering packets in a network switch is discussed in U.S. patent application Ser. No. 09/343,411. Such a switch employs a Fast Filtering Processor (FFP) to perform the desired filtering. Filter masks are applied to portions of the incoming packet and a Rule Table is searched for actions to be taken if there is a match with a key found in the Rule Table. The general process of filtering with the FFP is discussed below with respect to the present invention.

Another aspect that is important in a network environment is the policing of traffic. Traffic policing is crucial in running a network for security and performance reasons. A policy, implemented for a network environment, determines which type of data traffic is allowed to the network. Implementing an Access Control List is a basic mechanism for a network administrator to control the traffic. However, prior art switches and systems have limitations that can impede the overall effectiveness of such policing and can adversely affect the operational speed of a switch. Thus, there is a need to provide access control of switched data through a network switch that does not impede the processing of data by that switch.

SUMMARY OF THE INVENTION

The present invention is directed to a switch-on-chip solution for a switch, capable of using Ethernet, Fast Ethernet, 1 gigabit and 10,000 Mbits/s Ethernet systems, wherein all of the hardware is disposed on a single microchip. The present invention is also directed to methods employed to enable and control access on a network switch.

The invention is therefore directed to a network switch for network communications, with the data switch including a data port interface, supporting a plurality of data ports transmitting and receiving data. The switch also includes a CPU interface configured to communicate with a CPU and a memory management unit, including a memory interface for communicating data from the data port interface to switch memory. A communication channel is also provided, communicating data and messaging information between the data port interface, the CPU interface, the switch memory, and the memory management unit. The data port interface also includes an access control unit that filters the data coming into the data port interface and takes selective action on the data by applying a set of filter rules such that access to the switch is controlled by the set of filter rules.

The access control unit can be programmed by inputs from the CPU through the CPU interface. The data port interface may also include a filter mask table interface and a filter rules table thereupon, the set of filter rules being contained in the filter rules table. Additionally, the access control unit applies a filter mask to a packet incoming thereto, providing a filter result, wherein the filter result is applied to the filter rules in the filter rules table, and wherein action is taken on the data based upon the filtering result. Alternatively, the data port interface, the CPU interface, the memory management unit, the communications channel and the access control unit can all be implemented on a common semiconductor substrate.

In a network switch of the present invention, the functions of the access control filter can accomplished by a fast filtering processor. Additionally, the switch can control access to incoming data independent of the CPU interface, i.e. without communicating with the CPU, or in conjunction with communication with the CPU through the CPU interface. In either case, the filter rules of the network switch can be changed by the CPU based on access control list set in the CPU. Each filter rule of the set of filter rules can have an associated index and conflicting filtering results based on the application of the filter rules can be resolved through the associated indices of the filter rules.

The invention is also directed to a method for handling data packets that includes placing incoming packets into an input queue. The incoming packet is then filtered through application of a set of filter rules by an access control unit in order to determine if the incoming packet should have access through the network switch. Then, the packet is discarded, forwarded, or modified based upon the application of the set of filter rules. The set of filter rules may be received through communication with a CPU through a CPU interface. The CPU can further update the filter rules of the set of filter rules based on an access control list set in the CPU, where the updating can include adding additional filter rules. Additionally, each filter rule of the set of filter rules can have an associated index, which can be used to resolve conflicting filtering results based on the application of the filter rules.

BRIEF DESCRIPTION OF THE DRAWINGS

The objects and features of the invention will be more readily understood with reference to the following description and the attached drawings, wherein.

DETAILED DESCRIPTION OF THE PREFERRED EMBODIMENTS

The methods and apparatuses of the present invention enable traffic policing based on access control lists. The present invention supports traffic policing because of features built into structure of the network switch, described below, as well as intelligence built into software used with the network switch. The general structure of a network switch of embodying the present invention is discussed and then the general process of filtering data is described in more detail below. Next a brief overview of Access Control is described, the specific features of the present invention that are pertinent to traffic policing are discussed, and how these features are applied to some traffic policing applications are detailed.

Figure 1:
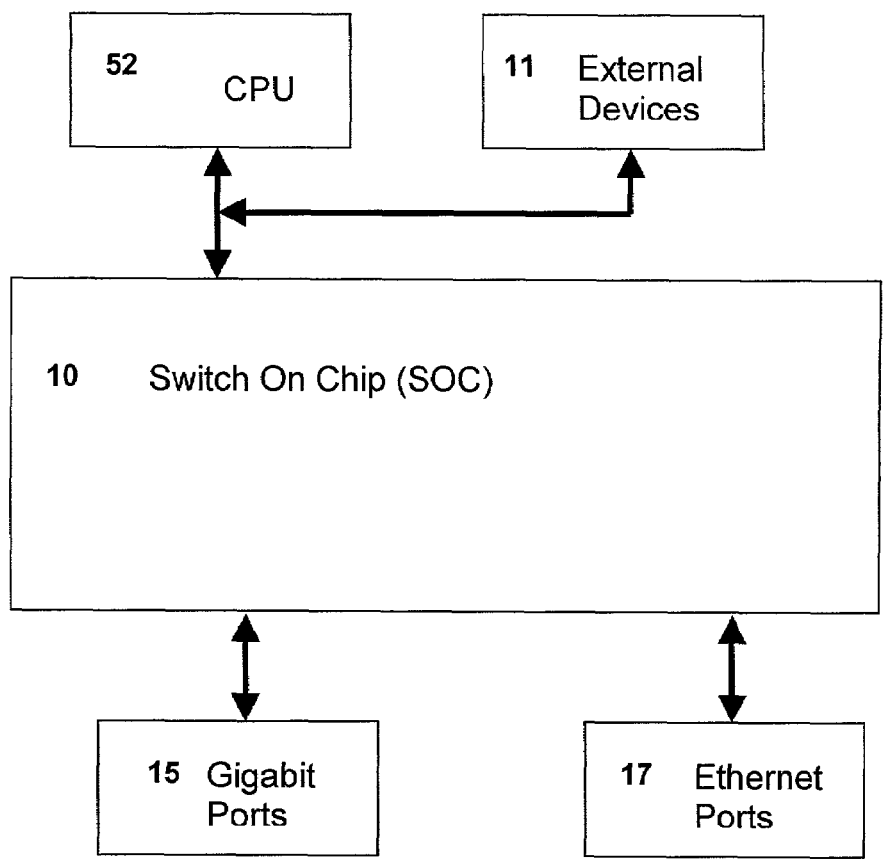
FIG. 1 is a general block diagram of elements of the present invention.

FIG. 1 illustrates a configuration wherein a switch-on-chip (SOC) 10, in accordance with the present invention, is functionally connected to external devices 11, a central processing unit (CPU) 52, gigabit Ethernet ports 15, and Ethernet ports 17. For the purposes of this embodiment, the Gigabit Ethernet ports 15, which are high speed Ethernet ports, are capable of operating at 1000 Mbps, but are also capable of operating at speeds ranging from 10 Mbps to 100 Mbps. While the switch on chip is shown as being connected to Ethernet ports as well, embodiments of this invention are applicable to switches that connect only to Gigabit Ethernet ports. External devices 11 could include other switching devices for expanding switching capabilities, or other devices as may be required by a particular application. CPU 52 can be used as necessary to program SOC 10 with rules which are appropriate to control packet processing. However, once SOC 10 is appropriately programmed or configured, SOC 10 operates, as much as possible, in a free running manner without communicating with CPU 52. Because CPU 52 does not control every aspect of the operation of SOC 10, CPU 52 performance requirements, at least with respect to SOC 10, are fairly low. A less powerful and therefore less expensive CPU 52 can therefore be used when compared to known network switches.

It should be noted that any number of gigabit Ethernet ports 15 or Ethernet ports 17 can be provided. In one embodiment, 8 gigabit ports 15 can be provided. Similarly, additional interconnect links to additional external devices 11 and CPUs 52 may be provided as necessary.

SOC 10 includes a plurality of Ethernet Port Interface Controllers (EPIC) 20*a*, 20*b*, 20*c*, etc., a plurality of Gigabit Port Interface Controllers (GPIC) 30*a*, 30*b*, etc., a CPU Management Interface Controller (CMIC) 40, a Common Buffer Memory Pool (CBP) 50, a Pipelined Memory Management Unit (PMMU) 70, including a Common Buffer Manager (CBM) 71, and a system-wide bus structure referred to as CPS channel 80. The PMMU 70 communicates with external memory 12, which includes a Global Buffer Memory Pool (GBP) 60. The CPS channel 80 comprises C channel 81, P channel 82, and S channel 83.

Figure 2:
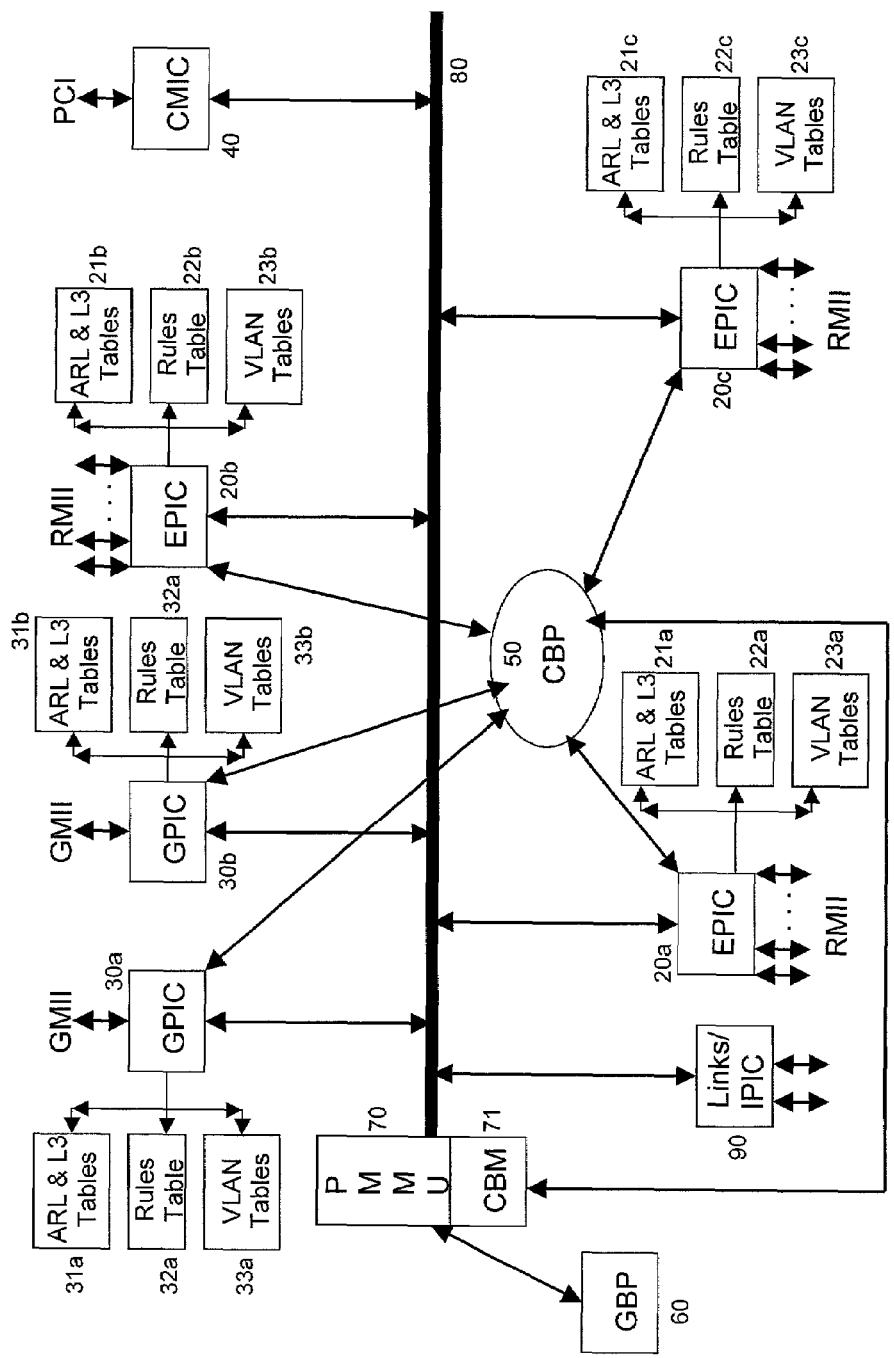
FIG. 2 is block diagram of elements of the switch on chip of the present invention.

The CPS channel is also referred to as the Cell Protocol Sideband Channel, and is a 17 Gbps channel which glues or interconnects the various modules together. As also illustrated in FIG. 2, other high speed interconnects can be provided, as shown as an extendible high speed interconnect. In one embodiment of the invention, this interconnect can be in the form of an interconnect port interface controller (IPIC) 90, which is capable of interfacing CPS channel 80 to external devices 11 through an extendible high speed interconnect link.

As will be discussed below, each EPIC 20*a*, 20*b*, and 20*c*, generally referred to as EPIC 20, and GPIC 30*a* and 30*b*, generally referred to as GPIC 30, are closely interrelated with appropriate address resolution logic and layer three switching tables 21*a*, 21*b*, 21*c*, 31*a*, 31*b*, rules tables 22*a*, 22*b*, 22*c*, 31*a*, 31*b*, and VLAN tables 23*a*, 23*b*, 23*c*, 31*a*, 31*b*. These tables will be generally referred to as 21, 31, 22, 32, 23, 33, respectively. These tables, like other tables on SOC 10, are implemented in silicon as two-dimensional arrays.

In a preferred embodiment of the invention, each EPIC 20 supports 8 fast Ethernet ports 13, and switches packets to and/or from these ports as may be appropriate. The ports, therefore, are connected to the network medium (coaxial, twisted pair, fiber, etc.) using known media connection technology, and communicates with the CPS channel 80 on the other side thereof. The interface of each EPIC 20 to the network medium can be provided through a Reduced Media Internal Interface (RMII), which enables the direct medium connection to SOC 10. As is known in the art, auto-negotiation is an aspect of Fast Ethernet, wherein the network is capable of negotiating a highest communication speed between a source and a destination based on the capabilities of the respective devices. The communication speed can vary, as noted previously, between 10 Mbps and 100 Mbps; auto negotiation capability, therefore, is built directly into each EPIC module.

The address resolution logic (ARL) and layer three tables (ARL/L3) 21*a*, 21*b*, 21*c*, rules table 22*a*, 22*b*, 22*c*, and VLAN tables 23*a*, 23*b*, and 23*c* are configured to be part of or interface with the associated EPIC in an efficient and expedient manner, also to support wirespeed packet flow.

Each EPIC 20 has separate ingress and egress functions. On the ingress side, self-initiated and CPU-initiated learning of level 2 address information can occur. Address resolution logic is utilized to assist in this task. Address aging is built in as a feature, in order to eliminate the storage of address information which is no longer valid or useful. The EPIC also carries out layer 2 mirroring. A fast filtering processor (FFP) 27 (see FIG. 3) is incorporated into the EPIC, in order to accelerate packet forwarding and enhance packet flow. The ingress side of each EPIC and GPIC has a significant amount of complexity to be able to properly process a significant number of different types of packets which may come in to the port, for linespeed buffering and then appropriate transfer to the egress. Functionally, each port on each module of SOC 10 has a separate ingress submodule 14 associated therewith. From an implementation perspective, however, in order to minimize the amount of hardware implemented on the single-chip SOC 10, common hardware elements in the silicon will be used to implement a plurality of ingress submodules on each particular module. The configuration of SOC 10 discussed herein enables concurrent lookups and filtering, and therefore, processing of up to 6.6 million packets per second. Layer two lookups, Layer three lookups and filtering occur simultaneously to achieve this level of performance.

On the egress side, the EPIC is capable of supporting packet polling based either as an egress management or class of service (COS) function. Rerouting/scheduling of packets to be transmitted can occur, as well as head-of-line (HOL) blocking notification, packet aging, cell reassembly, and other functions associated with Ethernet port interface.

Each GPIC 30 is similar to each EPIC 20, but supports only one gigabit Ethernet port, and utilizes a port-specific ARL table, rather than utilizing an ARL table which is shared with any other ports. Additionally, instead of an RMII, each GPIC port interfaces to the network medium utilizing a gigabit media independent interface (GMII).

CMIC 40 acts as a gateway between the SOC 10 and the host CPU. The communication can be, for example, along a PCI bus, or other acceptable communications bus. CMIC 40 can provide sequential direct mapped accesses between the host CPU 52 and the SOC 10. CPU 52, through the CMIC 40, will be able to access numerous resources on SOC 10, including MIB counters, programmable registers, status and control registers, configuration registers, ARL tables, port-based VLAN tables, IEEE 802.1q VLAN tables, layer three tables, rules tables, CBP address and data memory, as well as GBP address and data memory. Optionally, the CMIC 40 can include DMA support, DMA chaining and scatter-gather, as well as master and target PCI64.

Common buffer memory pool or CBP 50 can be considered to be the on-chip data memory. In one embodiment of the invention, the CBP 50 is first level high speed SRAM memory, to maximize performance and minimize hardware overhead requirements. The CBP can have a size of, for example, 720 kilobytes running at 132 MHz. Packets stored in the CBP 50 are typically stored as cells, rather than packets. As illustrated in the figure, PMMU 70 also contains the Common Buffer Manager (CBM) 71 thereupon. CBM 71 handles queue management, and is responsible for assigning cell pointers to incoming cells, as well as assigning common packet IDs (CPID) once the packet is fully written into the CBP. CBM 71 can also handle management of the on-chip free address pointer pool, control actual data transfers to and from the data pool, and provide memory budget management.

Global memory buffer pool or GBP 60 acts as a second level memory, and can be located on-chip or off chip. In the preferred embodiment, GBP 60 is located off chip with respect to SOC 10. When located off-chip, GBP 60 is considered to be a part of or all of external memory 12. As a second level memory, the GBP does not need to be expensive high speed SRAMs, and can be a slower less expensive memory such as DRAM. The GBP is tightly coupled to the PMMU 70, and operates like the CBP in that packets are stored as cells. For broadcast and multicast messages, only one copy of the packet is stored in GBP 60.

As shown in the figure, PMMU 70 is located between GBP 60 and CPS channel 80, and acts as an external memory interface. In order to optimize memory utilization, PMMU 70 includes multiple read and write buffers, and supports numerous functions including global queue management, which broadly includes assignment of cell pointers for rerouted incoming packets, maintenance of the global FAP, time-optimized cell management, global memory budget management, GPID assignment and egress manager notification, write buffer management, read prefetches based upon egress manager/class of service requests, and smart memory control.

Figure 3:
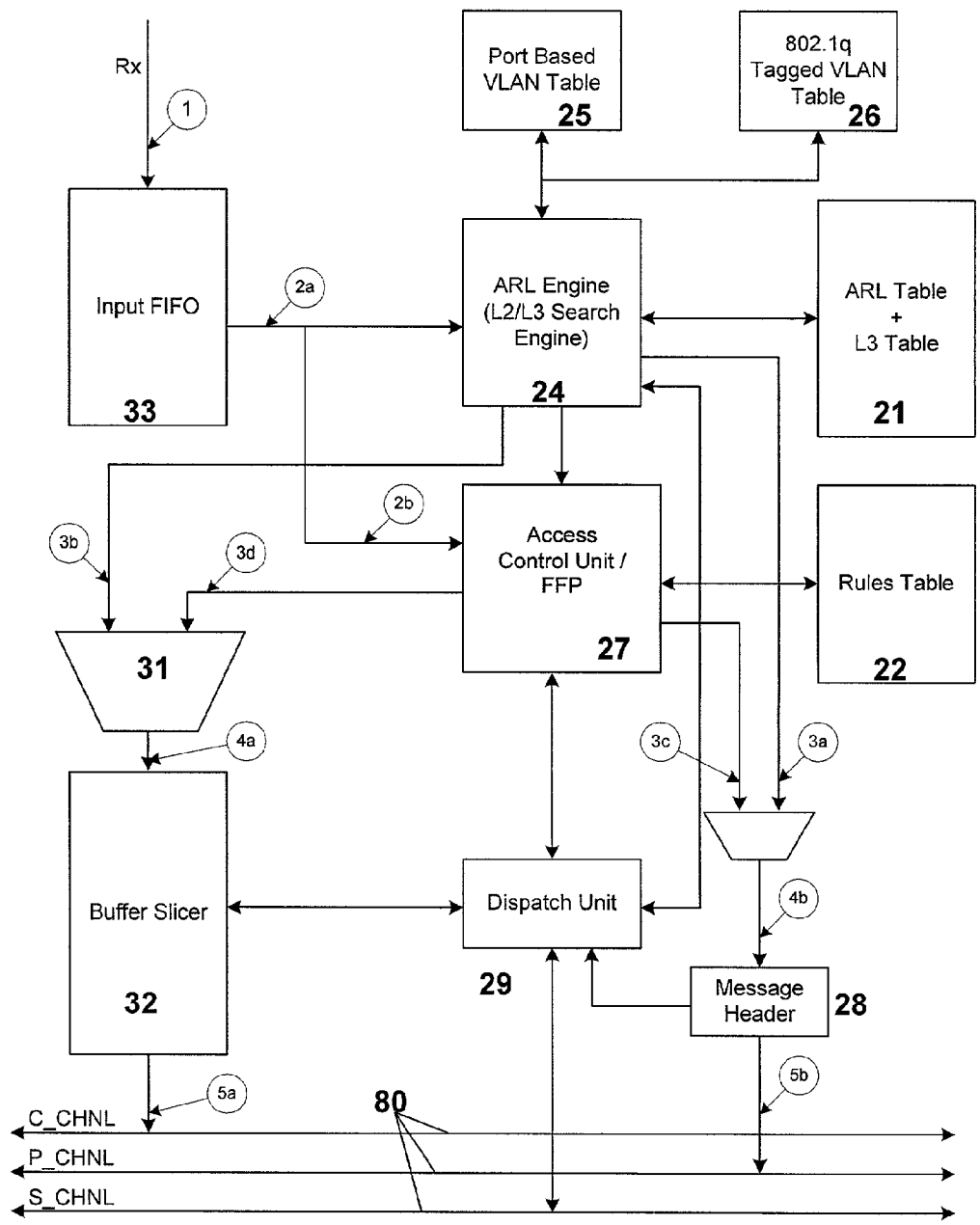
FIG. 3 illustrates data flow in ingress in the switch of the present invention.

FIG. 3 illustrates some of the concurrent filtering and look-up details of a packet coming into the ingress side of a port of the switch. FIG. 3 addresses the application of filtering, address resolution, and rules application segments of SOC 10. These functions are performed simultaneously with respect to the CBP admission discussed above. As shown in the figure, packet is received at an input port of one of the EPIC 20 or GPIC 30. It is then directed to input FIFO 33. As soon as the first sixteen bytes of the packet arrive in the input FIFO 33, an address resolution request is sent to ARL engine 24 (step 2a); this initiates lookup in ARL/L3 tables 21.

If the packet has 802.1q Tag then the ARL Engine does the lookup based on 802.1q Tag in the TAG BASED VLAN TABLE. If the packet does not contain 802.1q Tag then ARL Engine gets the VLAN based on the ingress port from the PORT BASED VLAN TABLE. Once the VLAN is identified for the incoming packet, ARL Engine does the ARL Table search based on Source Mac Address and Destination Mac Address. The key used in this search is Mac Address+ VLAN Id. If the result of the ARL search is one of the L3 Interface Mac Address, then it does the L3 search to get the Route Entry. If an L3 search is successful then it modifies the packet as per Packet Routing Rules.

At step 2b, a Filtering Request is sent to an Access Control Unit (ACU) or a Fast Filtering Processor (FFP) 27 as soon as first 64 bytes arrive in the Input FIFO. The outcome of the ARL search, step 3a, is the egress port/ports, the Class Of Service (COS), Untagged Port Bitmap and also in step 3b the modified packet in terms of Tag Header, or L3 header and L2 Header as per Routing Rules. In the following discussion, while the FFP is cited as performing the filtering process, it is understood that the ACU is also implicitly recited when access to the switch is being controlled. The FFP applies all the configured Filters and results are obtained from the RULES TABLE.

The outcome of the Filtering Logic, at 3c, decides if the packet has to be discarded, sent to the CPU or, in 3d, the packet has to be modified in terms of 802.1q header or the TOS Precedence field in the IP Header. If the TOS Precedence field is modified in the IP Header then the IP Checksum needs to be recalculated and modified in the IP Header.

The outcome of FFP and ARL Engine, 31, in 4a, are applied to modify the packet in the Buffer Slicer 32. Based on the outcome of ARL Engine and FFP, 4b, the Message Header 28 is formed ready to go on the Protocol Channel 30. The Dispatch Unit 29 sends the modified packet over the cell Channel 80, in 5a, and at the same time, in 5b, sends the control Message on the Protocol Channel 80. The Control Message contains the information such as source port number, COS, Flags, Time Stamp and the bitmap of all the ports on which the packet should go out and Untagged Bitmap.

FFP 27 is essentially a state machine driven programmable rules engine. The filters used by the FFP are 64 (sixty-four) bytes wide, and are applied on an incoming packet; any offset can be used, however, a preferred embodiment uses an offset of zero, and therefore operates on the first 64 bytes, or 512 bits, of a packet. The actions taken by the filter are tag insertion, priority mapping, TOS tag insertion, sending of the packet to the CPU, dropping of the packet, forwarding of the packet to an egress port, and sending the packet to a mirrored port.

The filters utilized by FFP 27 are defined by rules table 22. Rules table 22 is completely programmable by CPU 52, through CMIC 40. The rules table can be, for example, 256 entries deep, and may be partitioned for inclusive and exclusive filters, with, again as an example, 128 entries for inclusive filters and 128 entries for exclusive filters. A filter database, within FFP 27, includes a number of inclusive mask registers and exclusive mask registers, such that the filters are formed based upon the rules in rules table 22, and the filters therefore essentially form a 64 byte wide mask or bit map which is applied on the incoming packet.

If the filter is designated as an exclusive filter, the filter will exclude all packets unless there is a match. In other words, the exclusive filter allows a packet to go through the forwarding process only if there is a filter match. If there is no filter match, the packet is dropped. In an inclusive filter, if there is no match, no action is taken but the packet is not dropped. Action on an exclusive filter requires an exact match of all filter fields. If there is an exact match with an exclusive filter, therefore, action is taken as specified in the action field; the actions which may be taken, are discussed above. If there is no full match or exact of all of the filter fields, but there is a partial match, then the packet is dropped. A partial match is defined as either a match on the ingress field, egress field, or filter select fields. If there is neither a full match nor a partial match with the packet and the exclusive filter, then no action is taken and the packet proceeds through the forwarding process. The FFP configuration, taking action based upon the first 64 bytes of a packet, enhances the handling of real time traffic since packets can be filtered and action can be taken on the fly. Without an FFP according to the invention, the packet would need to be transferred to the CPU for appropriate action to be interpreted and taken. For inclusive filters, if there is a filter match, action is taken, and if there is no filter match, no action is taken; however, packets are not dropped based on a match or no match situation for inclusive filters.

In summary, the FFP includes a filter database with eight sets of inclusive filters and eight sets of exclusive filters, as separate filter masks. As a packet comes into the FFP, the filter masks are applied to the packet; in other words, a logical AND operation is performed with the mask and the packet. If there is a match, the matching entries are applied to rules tables 22, in order to determine which specific actions will be taken. As mentioned previously, the actions include 802.1p tag insertion, 802.1p priority mapping, IP TOS (type-of-service) tag insertion, sending of the packet to the CPU, discarding or dropping of the packet, forwarding the packet to an egress port, and sending the packet to the mirrored port.

Since there are a limited number of fields in the rules table, and since particular rules must be applied for various types of packets, the rules table requirements are minimized in the present invention by the present invention setting all incoming packets to be "tagged" packets; all untagged packets, therefore, are subject to 802.1p tag insertion, in order to reduce the number of entries which are necessary in the rules table. This action eliminates the need for entries regarding handling of untagged packets. It should be noted that specific packet types are defined by various IEEE and other networking standards, and will not be defined herein.

Figure 4:
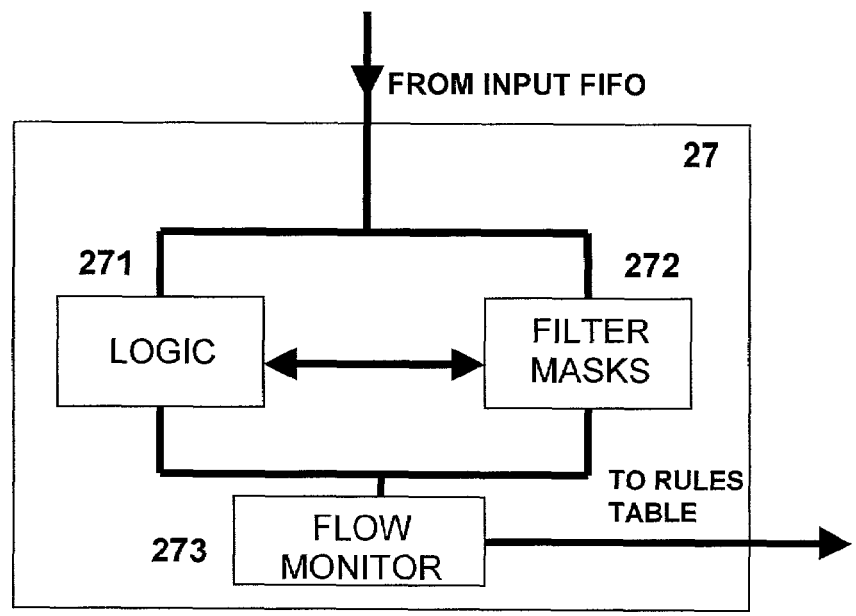
FIG. 4 is a block diagram of a fast filtering processor (FFP)

As noted previously, exclusive filters are defined in the rules table as filters which exclude packets for which there is no match; excluded packets are dropped. With inclusive filters, however, packets are not dropped in any circumstances. If there is a match, action is taken as discussed above; if there is no match, no action is taken and the packet proceeds through the forwarding process. Referring to FIG. 4, FFP 27 is shown to include filter database 272 containing filter masks therein, communicating with logic circuitry 271 for determining packet types and applying appropriate filter masks. When the packets are filtered based on flows, as discussed below, a flow monitor 273, is used to track the flows through the switch. After the filter mask is applied as noted above, the result of the application is applied to rules table 22, for appropriate lookup and action. It should be noted that the filter masks, rules tables, and logic, while programmable by CPU 52, do not rely upon CPU 52 for the processing and calculation thereof. After programming, a hardware configuration is provided which enables linespeed filter application and lookup.

Referring once again to FIG. 3, after FFP 27 applies appropriate configured filters and results are obtained from the appropriate rules table 22, logic 271 in FFP 27 determines and takes the appropriate action. The filtering logic can discard the packet, send the packet to the CPU 52, modify the packet header or IP header, and recalculate any IP checksum fields or takes other appropriate action with respect to the headers. The modification occurs at buffer slicer 32, and the packet is placed on C channel 80. The control message and message header information is applied by the FFP 27 and ARL engine 24, and the message header is placed on P channel 80. Dispatch unit 29 coordinates all dispatches to C channel, P channel and S channel.

As noted previously, each EPIC module 20, GPIC module 30, PMMU 70, etc. are individually configured to communicate via the CPS channel. Each module can be independently modified, and as long as the CPS channel interfaces are maintained, internal modifications to any modules such as EPIC 20a should not affect any other modules such as EPIC 20b, or any GPICs 30.

Figure 5:
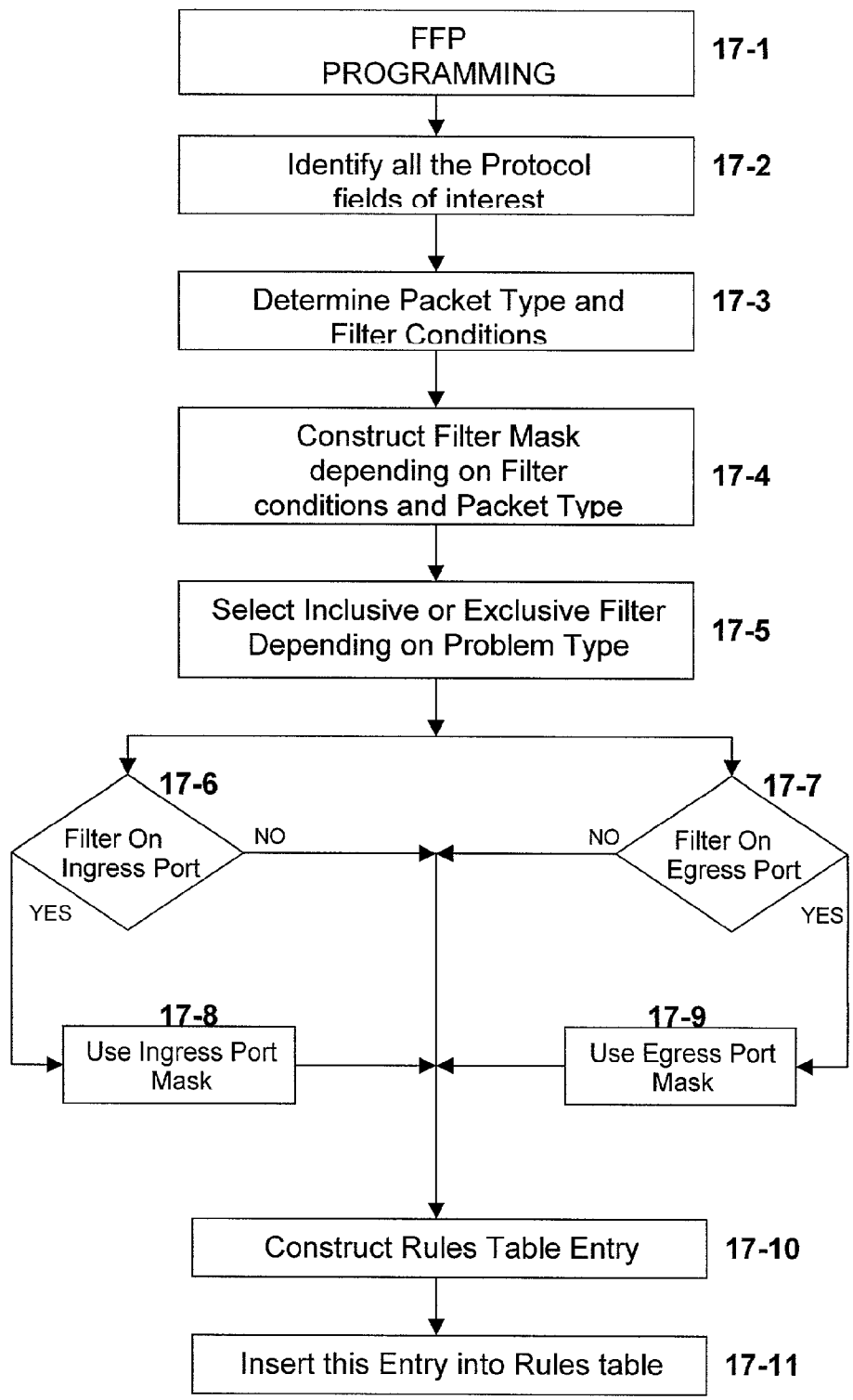
FIG. 5 illustrates a series of steps which are used to program an FFP.

As mentioned previously, FFP 27 is programmed by the user, through CPU 52, based upon the specific functions which are sought to be handled by each FFP 27. Referring to FIG. 5, it can be seen that in step 17-1, an FFP programming step is initiated by the user. Once programming has been initiated, the user identifies the protocol fields of the packet which are to be of interest for the filter, in step 17-2. In step 17-3, the packet type and filter conditions are determined, and in step 17-4, a filter mask is constructed based upon the identified packet type, and the desired filter conditions. The filter mask is essentially a bit map which is applied or ANDed with selected fields of the packet. After the filter mask is constructed, it is then determined whether the filter will be an inclusive or exclusive filter, depending upon the problems which are sought to be solved, the packets which are sought to be forwarded, actions sought to be taken, etc. In step 17-6, it is determined whether or not the filter is on the ingress port, and in step 17-7, it is determined whether or not the filter is on the egress port. If the filter is on the ingress port, an ingress port mask is used in step 17-8. If it is determined that the filter will be on the egress port, then an egress mask is used in step 17-9. Based upon these steps, a rules table entry for rules tables 22 is then constructed, and the entry or entries are placed into the appropriate rules table (steps 17-10 and 17-11). These steps are taken through the user inputting particular sets of rules and information into CPU 52 by an appropriate input device, and CPU 52 taking the appropriate action with respect to creating the filters, through CMIC 40 and the appropriate ingress or egress submodules on an appropriate EPIC module 20 or GPIC module 30.

Figure 6:
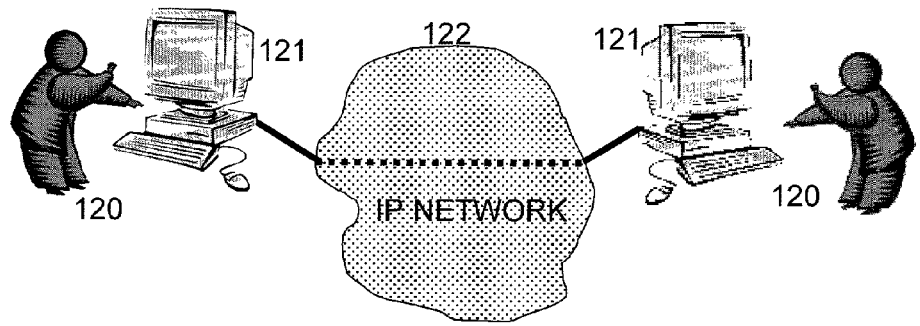
FIG. 6 illustrates a network architecture that can be used with the present invention.
Figure 7:
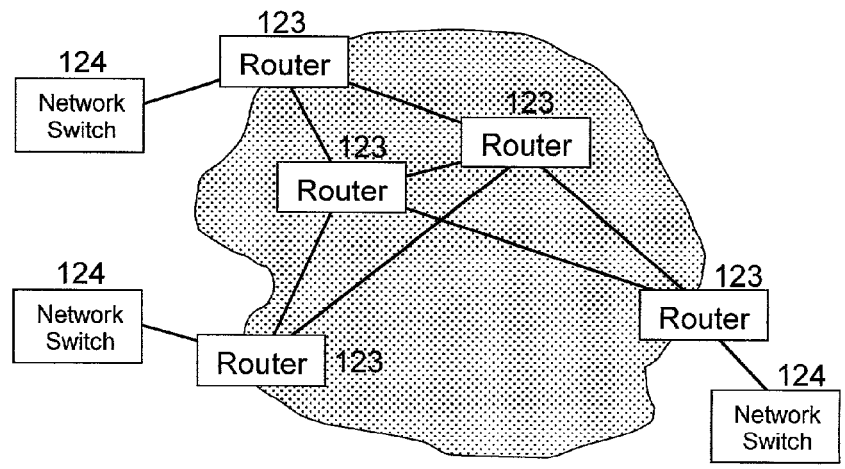
FIG. 7 is schematic showing routers and network switch.

An illustrative system configuration is generally illustrated in FIG. 6. In this configuration, two personal computers (PCs) 121, each with network access capability, allow users 120 to exchange data with each other through an IP network 122. In this type of system and/or configuration, the communications are transmitted over an IP data network 122. A general illustration of a configuration of the invention is shown in FIG. 7. Each of network switches 124, which are generally equivalent to the exemplary network switch (SOC 10) described above, which are positioned on the outer edge or boundary of IP network 122, and are configured to utilize the fast filtering processor (FFP) 27 to identify related packets and take appropriate actions upon the identified packets in order to facilitate transmission of the packets through the network. The fast filtering processor 27 of network switch 124 operates to apply the filter mask discussed above to the packet header of every packet coming through network switch 124.

Upon applying the mask to the packet header, the remaining information is then compared to entries residing in rules table 22 located in the network switch 124. If a match is found between the masked information from the packet header and an entry in the rules table 22 of the network switch, then the fast filtering processor 27 takes an action upon the packet in accordance with a predetermined action field stored in the network switch. Alternatively, an exclusive filter scheme could be employed, wherein a no-match state triggered taking action in accordance with the action fields. Nonetheless, the actions corresponding to the predetermined action field may include changing or modifying the Layer 2 priority associated with the packet, changing the type of service (TOS) associated with the packet, modifying the differentiated services code point (DSCP) associated with the packet, sending the packet to a queue for a predetermined Class of Service (COS), sending the packet to the CPU via the CPU interface, or discarding the packet, in addition to other switching actions.

Figure 8:
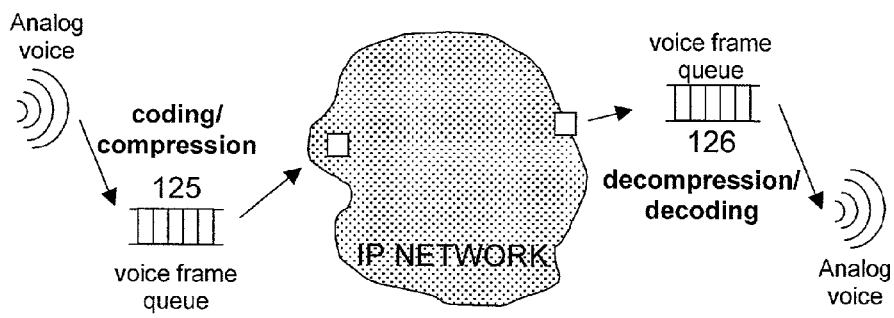
FIG. 8 illustrates voice over IP, where such access can be mediated through the methods of the present invention.

One application that is used on a network environment, that is of special interest to the access control of the present invention, is voice over IP (VOIP). When a voice conversation is transmitted through a data network, it must first be broken down in to small "pieces" of audio. This process is illustrated generally in FIG. 8. Each of these pieces, termed a voice packet or voice frame, consists of a very short duration, generally from 10 to 30 ms, of audio. A string of voice packets, which when assembled form a continuous audio stream, are generally compressed, linked together with a common packet header, and transmitted through the data network to the destination IP address.

In discussing the access control of the present invention, the role of an access control list must be discussed. The access control features most pertinent to network switches are access permission and denial. Access permission is, in most cases, an exception to a general access denial policy. Likewise, access denial is an exception to a general permission. In the present invention, access control is enabled on a per flow basis. A traffic flow can be defined as traffic based on network addresses, application type and other criteria.

In the present invention, commands can be implemented using the FFP to control access. The commands, and examples of using the commands, are based on the document *Cisco IOS IP and IP Routing Command Interface*. The commands pertinent to the StrataSwitch are mostly about traffic policing. An access control list specifies the traffic that are allowed or denied access to the networking equipment. It consists of one or more access control commands. In the access controls that are relevant to the present invention, a command has the following format:

access-list <access-list identifier> permit|deny
        <parameter> . . .

The parameters specify what type of traffic is being access controlled, i.e. permitted or denied in the network. The traffic may be based on network address/subnet, application type, protocol type, etc. In the following table, the parameters that are most pertinent to permit or deny commands are described below:

TABLE 1

| Command Parameters | Descriptions |
|---|---|
| <protocol> | Layer III protocol in frame header or layer IV protocol in IP header |
| <IP> <wild-card> | specifies the network addresses in the ACL; <IP> specifies the IP address/subnet to be used; <wild-card>, in the same format as a regular IP address, specifies the wildcard value of the IP address (0 = must match, FF = ignored); any ACL must have two such pairs, the first one for the access control for the packet origin, while the second one for the packet destination |
| any | may replace any <IP> <wild-card> pair; same semantics as FF.FF.FF.FF in the <wild-card> |
| precedence <precedence> | precedence field in IP header |
| tos <tos> | type-of-service field in IP header |
| <icmp-type> | for an icmp message, the icmp-type field in IP payload, this parameter is specified in numeric (0-255) |
| <icmp-code> | for an icmp message, the icmp-code field in IP payload, this parameter is specified in numeric (0-255) |
| <icmp-message> | for an icmp message, the combined icmp type and code fields. The icmp-message is specified in a mnemonic, which is translated to a value from 0 to 255. |

TABLE 1-continued

| Command Parameters | Descriptions |
|---|---|
| <igmp-type> | for an igmp message, the IGMP type field in the IP payload |
| eq <port> | destination port number in TCP/UDP header |
| established | for a TCP packet, the ACK bit or RST bit in CODE BITS in TCP header |
| eq <protocol> | ACL is applicable to an application protocol <protocol> |
| no-<protocol> | no application protocol <protocol> allowed |
| <time-range-id> | ACL is only effective in a specified time range <time-range-id>, which is predefined in a time-range command. |

As discussed above with respect to the FFP, the FFP will use each filter mask to mask out certain fields of the packet, and determine whether the masked out packet matches the relevant filter rules. The mask covers four of the first five 16-byte segments of the packet. If there is a match, some specific action will be taken.

For instance, if the switch wants to capture all the packets of a particular application, like RTSP (Real-Time Streaming Protocol), the following filter mask will be used:

0000 0000 0000 0000 0000 0000 0000 0000

0000 0000 0000 0000 0000 0000 0000 0000

0000 0000 0000 0000 FFFF 0000 0000 0000

0000 0000 0000 0000 0000 0000 0000 0000.

Every packet executed with this mask will only have bytes (0-based) 40 and 41 untouched. After the masking, the packet will be matched with all the rules associated with this mask, one of which has the value 0×022A (554 decimal) in bytes 40 and 41, shown below:

0000 0000 0000 0000 0000 0000 0000 0000

0000 0000 0000 0000 0000 0000 0000 0000

0000 0000 0000 0000 022A 0000 0000 0000

0000 0000 0000 0000 0000 0000 0000 0000.

Thus if the packet is an RTSP packet, it will have value 554 in its TCP destination port field and result in a match. Packet classifications result in the matched packets receiving special processing. The two actions related to traffic policing are discarding a packet and explicitly switching a packet.

The switch on chip of the present invention has a built-in mechanism to resolve filter rule conflicts. Filtering conflict arises when there are two rules matching the same packet, while the two rules calling for two conflicting actions to be taken, such as discarding a packet and changing the packet's priority. When two rules match the same packet, the action associated with the filter of a higher mask index (the FSEL field of the rule) is executed. With that in mind, the network administrator who implements Access Control must carefully order the filter masks such that conflict resolution behaves as expected.

Some sample applications of access control according to the present invention are discussed below. While the following applications are discussed in detail, the discussions of these applications should not be seen as limiting; rather the present invention can be used to enable access control in a variety of applications. In a LAN, if the administrator wants to disable all Web browsing traffic. i.e., no HTTP traffic can go through, a simple traffic denial is put into effect.

To implement this access control, only one access control command is required. That command would have the form of:

access-list 101 deny ip any eq http.

The above access control requires one filter mask (Table 2) and one filter rule (Table 3) to enable this access list:

TABLE 2

| Ingress Port Mask | Egress Port Mask | Filter Mask |
|---|---|---|
| 0 | 0 | 0000 0000 0000 0000 0000 0000 0000 0000 |
|   |   | FFFF 0000 0000 0000 0000 0000 0000 0000 |
|   |   | 0000 0000 0000 0000 FFFF 0000 0000 0000 |
|   |   | 0000 0000 0000 0000 0000 0000 0000 0000 |

TABLE 3

| Filter Select | Action | Filter Value |
|---|---|---|
| 0 | 10 | 0000 0000 0000 0000 0000 0000 0000 0000 |
|   |   | 0800 0000 0000 0000 0000 0000 0000 0000 |
|   |   | 0000 0000 0000 0000 0050 0000 0000 0000 |
|   |   | 0000 0000 0000 0000 0000 0000 0000 0000 |

This filter rule will match all packets that have 0×0800 at its Layer 2 Frame Protocol Field, which indicates an IP packet; and 0×0050 at its TCP/UDP destination port field, which is the Well-Known-Port (WKP) for HTTP message. The action for a rule match is to discard the packet, which is indicated by having bit 4 (the least significant bit being bit 0) set. This is specified by the value 0×10 in the ACTION field.

In another application, the LAN owner or administrator may want to disable web access as in the previous example, but only during certain hours. The access control list thus requires a qualification, which is a time range of that the access control list is in effect:

time-range no-http
   periodic weekdays 8:00 to 18:00
!
access-list 101 deny tcp any eq http time-range This command is implemented in conjunction with the CPU, which places the filter into the filter table at 08:00 and removes it at 18:00 every weekday. The filter is the same as the one used in the previous example, but shows the expandability of the filtering process.

In another example, the LAN administrator may want to deny all IP traffic, except ICMP traffic, originated from the subnet 192.168.3.xx. To implement this policy, the access control list consists of two commands and the following filter masks (Table 4) and filter rules (Table 5):

access-list 102 deny ip 192.168.3.0 0.0.0.255 any access-list 102 permit icmp 192.168.3.0 0.0.0.255 any

TABLE 4

| Ingress Port Mask | Egress Port Mask | Filter Mask |
|---|---|---|
| 0 | 0 | 0 | 0000 0000 0000 0000 0000 0000 0000 0000 FFFF 0000 0000 0000 0000 0000 0000 FFFF FF00 0000 0000 0000 0000 0000 0000 0000 0000 0000 0000 0000 0000 0000 0000 0000 |
| 1 | 0 | 0 | 0000 0000 0000 0000 0000 0000 0000 0000 0000 0000 0000 0000 0000 00FF 0000 FFFF FF00 0000 0000 0000 0000 0000 0000 0000 0000 0000 0000 0000 0000 0000 0000 0000 |

TABLE 5

| Filter Select | Action | Filter Value |
|---|---|---|
| 0 | 10 | 0000 0000 0000 0000 0000 0000 0000 0000 0800 0000 0000 0000 0000 0000 0000 C0A8 0300 0000 0000 0000 0000 0000 0000 0000 0000 0000 0000 0000 0000 0000 0000 0000 |
| 1 | 2000 | 0000 0000 0000 0000 0000 0000 0000 0000 0000 0000 0000 0000 0000 0001 0000 C0A8 0300 0000 0000 0000 0000 0000 0000 0000 0000 0000 0000 0000 0000 0000 0000 0000 |

This example illustrates the usage of conflict resolution in the FFP. In this scenario, all IP traffic originated from the 192.168.3.xx subnet is discarded. This is implemented by the first rule, with:

Layer III protocol type=0x0800 (IP), and

IP source address=0xC0A803 (192.168.3.xx).

Any packet matched is discarded, as specified by ACTION=0x10. However, an exception to this scenario is that if there is ICMP traffic originated from the 192.168.3.xx subnet, they should be switched. This is supported by the second rule, with:

Layer IV protocol type=0x01 (ICMP), and

IP source address=0xC0A803 (192.168.3.xx)

The action of the second rule is 0x2000. With bit 13 set, the FFP will not discard the packet. When a packet matches both rules, and when the actions are conflicting (discard vs. not discard), the rule with the higher associated filter masks wins out. In this case, since the first rule's Filter Select value is 0, while the second rule's is 1, the second rule wins the tiebreaker.

Another application requiring a more complex traffic permission scheme is discussed below. In this example, some application traffic that is not associated with just a Well-Known Port (WKP) is considered. The permission of such traffic is more complicated. In a case when the general traffic is denied, but only a special application is permitted, it requires the permission of all traffic in this type of application. In certain applications, it involves some dynamic ports in addition to the application's WKP.

For example, a LAN may only permit a certain type of IP telephony traffic in a particular subnet, while denying all other traffic in that subnet. The permitted traffic is represented by the standard protocol Session Initiation Protocol (SIP). This scenario is represented by the following Access Control List:

access-list 122 deny ip 192.168.5.0 0.0.0.255 192.168.5.0 0.0.0.255 access-list 122 permit ip 192.168.5.0 0.0.0.255 192.168.5.0 0.0.0.255 eq SIP

To implement this Access Control List, the following filters masks (Table 6) and rules (Table 7) are necessary:

TABLE 6

| Ingress Port Mask | Egress Port Mask | Filter Mask |
|---|---|---|
| 0 | 0 | 0 | 0000 0000 0000 0000 0000 0000 0000 0000 FFFF 0000 0000 0000 0000 0000 0000 FFFF FF00 FFFF FF00 0000 0000 0000 0000 0000 0000 0000 0000 0000 0000 0000 0000 0000 |
| 1 | 0 | 0 | 0000 0000 0000 0000 0000 0000 0000 0000 FFFF 0000 0000 0000 0000 0000 0000 FFFF FF00 FFFF FF00 0000 FFFF 0000 0000 0000 0000 0000 0000 0000 0000 0000 0000 0000 |

TABLE 7

| Filter Select | Action | Filter Value |
|---|---|---|
| 0 | 10 | 0000 0000 0000 0000 0000 0000 0000 0000 0800 0000 0000 0000 0000 0000 0000 C0A8 0500 C0A8 0500 0000 0000 0000 0000 0000 0000 0000 0000 0000 0000 0000 0000 0000 |
| 1 | 2000 | 0000 0000 0000 0000 0000 0000 0000 0000 0800 0000 0000 0000 0000 0000 0000 C0A8 0500 C0A8 0500 0000 13C4 0000 0000 0000 0000 0000 0000 0000 0000 0000 0000 0000 |

The second rule will match all packets in the subnet 192.168.5.xx with the destination port number equal to 5060 (0x13C4), which is the WKP for SIP, but all such SIP packets will also match the first rule. Since the second rule has a higher Filter Select value, it will win the tiebreaker. Thus the SIP packets will not be discarded.

However, these two rules are necessary but not sufficient. In a SIP session, the WKP is used only for session setup. Once a session is set up, the IP phone conversation is transmitted between two ports other than the WKP. These ports, known as dynamic ports, are negotiated between the two IP phones during the setup. They vary from call to call.

The present invention has the capability to capture the SIP session setup messages, and find out about the dynamic ports to be used for the voice transmission. Thus two addition rules will be inserted into the rule table to permit all the traffic between these two ports. For example, in a session between two IP phones 192.168.5.22 and 192.168.5.203, if the voice traffic from 192.168.5.22 to 192.168.5.203 uses the port 7001 (0x1B59), while the traffic in the other direction uses the port 7105 (0x1BC1), the following two rules are also required:

TABLE 8

| Filter Select | Action | Filter Value |
|---|---|---|
| 1 | 2000 | 0000 0000 0000 0000 0000 0000 0000 0000 0800 0000 0000 0000 0000 0000 0000 C0A8 0516 C0A8 05CB 0000 1B59 0000 0000 0000 0000 0000 0000 0000 0000 0000 0000 0000 |
| 1 | 2000 | 0000 0000 0000 0000 0000 0000 0000 0000 0800 0000 0000 0000 0000 0000 0000 C0A8 05CB C0A8 0516 0000 1BC1 0000 0000 0000 0000 0000 0000 0000 0000 0000 0000 0000 |

These two rules only have the life span of the duration of the call. When the call is disconnected, they will be removed from the rule table. On the other hand, the rule regarding the WKP lives as long as the Access Control List is in effect.

The complement of the previous example is to deny all traffic of a particular application. In applications that involve more than the WKP, denial of such traffic requires more than a single rule. In fact, it may require a substantial number of rules if the access denial starts when there are a lot of on-going traffic of that application. For example, suppose the LAN administrator wants to deny all SIP traffic in a particular subnet. The ACL for that purpose is given as follows:

access-list 122 deny ip 192.168.5.0 0.0.0.255 192.168.5.0 0.0.0.255 eq SIP

This can be implemented by using the following mask and rule:

TABLE 9

| Ingress Port Mask | Egress Port Mask | Filter Mask |
|---|---|---|
| 1 | 0 | 0 | 0000 0000 0000 0000 0000 0000 0000 0000 FFFF 0000 0000 0000 0000 0000 0000 FFFF FF00 FFFF FF00 0000 FFFF 0000 0000 0000 0000 0000 0000 0000 0000 0000 0000 0000 |

TABLE 10

| Filter Select | Action | Filter Value |
|---|---|---|
| 1 | 10 | 0000 0000 0000 0000 0000 0000 0000 0000 0800 0000 0000 0000 0000 0000 0000 C0A8 0500 C0A8 0500 0000 13C4 0000 0000 0000 0000 0000 0000 0000 0000 0000 0000 0000 |

However, this rule is not sufficient. Suppose there are several ongoing SIP calls in the LAN already. Since each of these calls uses its own dynamic ports, the above rule cannot stop the traffic between these dynamic ports. In essence, it will prohibit any new call from getting connected, but it does not disconnect any on-going calls.

Information regarding the on-going call is required to create new rules to handle this situation. The present invention is capable of keeping track of every SIP call, including the dynamic ports used. As soon as the ACL is enforced, such information will be used to create the new rules to discard the voice packets between the dynamic ports. For example, in an on-going call between 192.168.3.42 and 192.168.3.55, the voice traffic from 192.168.3.42 to 192.168.3.55 uses dynamic port 7510 (0×1D56), while the voice traffic in the other direction uses dynamic port 7530 (0×1D6A), the following two rules are required to explicitly discard the voice packets between the two:

TABLE 11

| Filter Select | Action | Filter Value |
|---|---|---|
| 1 | 10 | 0000 0000 0000 0000 0000 0000 0000 0000 0800 0000 0000 0000 0000 0000 0000 C0A8 052A C0A8 0537 0000 1D56 0000 0000 0000 0000 0000 0000 0000 0000 0000 0000 0000 |
| 1 | 10 | 0000 0000 0000 0000 0000 0000 0000 0000 0800 0000 0000 0000 0000 0000 0000 C0A8 0537 C0A8 052A 0000 1D6A 0000 0000 0000 0000 0000 0000 0000 0000 0000 0000 0000 |

There is no definitive way of determining how long these rules will stay in the rule table. When the two parties talking on the phone hear no more voice from each other, the most likely consequence is to hang up the phone, rendering the rules redundant. The rules may be removed from the table after a pre-determined time-out. The rule regarding the WKP of SIP stays in the table as long as the ACL is in effect, to prohibit any new call from getting connected.

The FFP of the present invention provides a powerful tool for controlling network traffic. The FFP is able to regulate network traffic according to a specified Access Control List. In summary, most of the access control commands can be implemented by FFP in a straightforward manner. The FFP can enable access control based on a flow, which is defined as traffic in a specific application, addresses, subnets and other criteria. Among the FFP features, there are actions like drop packets and permit packets that control the access according to the matching criteria of the filters. With the help of the CPU, access control can also be enabled and disabled dynamically, based on time-of-the-day, dates, and other conditions.

Coupled with intelligent software in the CPU, the network switch of the present invention is also capable of offering Access Control to more complex network traffic. The software has the intelligence to snoop into traffic going through the switch, and retrieve information regarding the traffic of various applications, like Voice over IP and streaming media. With this capability, the present invention offers policing of traffic flows that are not known a priori.

Access control of more complex network traffic is discussed below. Filters are setup in the filter table based on the Application Layer protocol type, i.e. packets are filtered based on information in the Transport Layer (Layer 4 in the ISO seven-layer model). After the initial filters are set, the Access Control Unit (ACU) is capable of adding new filters into the filter tables when the switch encounters certain types of packets. This dynamic creation of filter rules is discussed below with respect to a specific application.

The dynamic creation of filter rules can occur, for example, in the setup and processing of Voice over IP (VOIP) applications. The process starts with types of packets that are called setup packets. These packets carry information regarding the media channels used in the subsequent a VOIP session. Such information belong to the Transport Layer.

The ACU is capable of decoding the packet and extracting such Transport Layer information. The ACU creates new filters based on the extracted Transport Layer information. Such new filters filter all the media packets (voice or video) that pass through the switch. Access control (permit or deny) are then applied to these media packets.

In case of permission of media packets, the ACU will remove the filter upon disconnection of the call. In case of denial of media packets, the filter will stay in the table indefinitely. Some timeout mechanism is required for the ACU to remove the filter. Thus, the present invention allows for dynamic access based on the application and allows for control of traffic even when the precise identifiers of packet data are not known initially.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A network switch for network communications, said network switch comprising:
   a data port interface, said data port interface supporting a plurality of data ports transmitting and receiving data;
   a CPU interface, said CPU interface configured to communicate with a CPU;
   a memory management unit, said memory management unit including a memory interface for communicating data from said data port interface to switch memory; and
   a communication channel, communicating data and messaging information between said data port interface, the CPU interface, said switch memory, and said memory management unit;
   wherein said data port interface further comprises an access control unit configured to decode packets and extract information from a transportation layer,
   configured to dynamically update filter rules to add a new filter rule to an initial set of filter rules, wherein the initial set of filter rules is based on an access control list, and the new filter rule is based on the extracted information from the transportation layer,
   configured to filter the incoming packets through application of the dynamically updated filter rules, and
   configured to take selective action on the packets by applying the dyamically updated filter rules, wherein a dynamic handling of packets and a controlling of data traffic are achieved when precise identifiers of packet data are not known initially.

2. A network switch as recited in claim 1, wherein said access control unit is programmable by inputs from the CPU through the CPU interface.

3. A network switch as recited in claim 1, wherein said data port interface includes a filter mask table interface and a filter rules table thereupon, said dynamically updated filter rules being contained in the filter rules table, and wherein said access control unit applies a filter mask to a packet incoming thereto, providing a filter result, wherein said filter result is applied to the filter rules in said filter rules table, and wherein action is taken on the data based upon the filtering result.

4. A network switch as recited in claim 3, wherein said data port interface, CPU interface, memory management unit, communications channel and said access control unit are implemented on a common semiconductor substrate.

5. A network switch as recited in claim 1, wherein said access control unit comprises a fast filtering processor.

6. A network switch as recited in claim 1, wherein the access control unit controls access to the switch by incoming data independent of the CPU interface, and therefore without communicating with the CPU.

7. A network switch as recited in claim 1, wherein the access control unit controls access to the switch by incoming data in conjunction with communication with the CPU through the CPU interface.

8. A network switch as recited in claim 7, wherein the CPU changes filter rules of the set of filter rules based on access control list set in the CPU.

9. A network switch as recited in claim 1, wherein each filter rule of the set of filter rules has an associated index and conflicting filtering results based on the application of the filter rules are resolved through the associated indices of the filter rules.

10. A method of handling data packets in a network switch, said method comprising:
    placing incoming packets into an input queue;
    decoding the packets and extracting information from a transportation layer;
    dynamically updating filter rules using an access control unit by adding a new filter rule to an initial set of filter rules, wherein the initial set of filter rules is based on an access control list, and wherein the new filter rule is based on the extracted information from the transportation layer;
    filtering the incoming packets through application of the dynamically updated filter rules by the access control unit in order to determine if the incoming packets should have access through the network switch; and
    discarding, forwarding, or modifying the packet based upon the application of the dynamically updated filter rules;
    wherein a dynamic handling of packet data and controlling of data traffic are achieved when precise identifiers of packet data are not known initially.

11. A method as recited in claim 10, wherein the initial set of filter rules is received through communication with a CPU through a CPU interface.

12. A method as recited in claim 11, wherein the method further comprises updating filter rules of a set of filter rules by the CPU based on the access control list set in the CPU.

13. A method as recited in claim 12, wherein the incoming packets are call set up packets of voice over IP applications.

14. A method as recited in claim 13, wherein the step of adding new filter rules to the initial filter rules occurs when certain types of packets are received and processed in the network switch.

15. A network switch as recited in claim 14, wherein each filter rule of the dynamically updated filter rules has an associated index and the network switch further comprises means for resolving conflicting filtering results based on the application of the dynamically updated filter rules through the associated indices of the filter rules.

16. A method as recited in claim 10, wherein each filter rule of the dynamically updated filter rules has an associated index and the method further comprises resolving conflicting filtering results based on the application of the dynamically updated filter rules through the associated indices of the filter rules.

17. A network switch for handling data packets comprising:
    means for placing incoming packets into an input queue;
    mean for decoding and extracting information from a transportation layer;
    means for dynamically updating filter rules using an access control unit by adding a new filter rule to an initial set of filter rules, wherein the initial set of filter rules is based on an access control list, and wherein the new filter rule is based on the extracted information from the transportation layer;

means for filtering the incoming packets through application of dynamically updated filter rules by the access control unit in order to determine if the incoming packets should have access through the network switch; and means for discarding, forwarding, or modifying the packet based upon the application of the set of filter rules;

wherein the network switch provides a dynamic handling of packet data and controlling of data traffic when precise identifiers of packet data are not known initially.

18. A network switch as recited in claim 17, the initial set of filter rules is received through communication with a CPU through a CPU interface.

19. A network switch as recited in claim 17, further comprising means for updating filter rules of a set of filter rules by the CPU based on the access control list set in the CPU.

20. A network switch as recited in claim 17 wherein the incoming packets are call set up packets of voice over IP applications.

21. A network switch as recited in claim 20, wherein the means for adding new filter rules to the initial filter rules is configured to add new filter rules when certain types of packets are received and processed in the network switch.

* * * * *